United States Patent
Chandran

(10) Patent No.: US 11,033,041 B2
(45) Date of Patent: Jun. 15, 2021

(54) TEA SOLID COMPOSITION AND PROCESS OF MAKING THE SAME

(71) Applicant: Sashee Bala Chandran, Los Gatos, CA (US)

(72) Inventor: Sashee Bala Chandran, Los Gatos, CA (US)

(73) Assignee: HUMBLE TEA, INC., Los Angeles, CA (US)

( * ) Notice: Subject to any disclaimer, the term of this patent is extended or adjusted under 35 U.S.C. 154(b) by 668 days.

(21) Appl. No.: 14/943,979

(22) Filed: Nov. 17, 2015

(65) Prior Publication Data

US 2016/0135476 A1 May 19, 2016

Related U.S. Application Data

(60) Provisional application No. 62/080,899, filed on Nov. 17, 2014.

(51) Int. Cl.
*A23F 3/14* (2006.01)
*A23F 3/40* (2006.01)
*A23F 3/32* (2006.01)

(52) U.S. Cl.
CPC ............... *A23F 3/14* (2013.01); *A23F 3/32* (2013.01); *A23F 3/405* (2013.01)

(58) Field of Classification Search
CPC .. A61K 2300/00; A61K 36/82; A61K 9/0095; A23L 2/395; A23F 3/14; A23F 3/00; A23F 5/12

See application file for complete search history.

(56) References Cited

U.S. PATENT DOCUMENTS

| | | | | |
|---|---|---|---|---|
| 4,031,238 A * | 6/1977 | Reid | ........................ | A23F 3/32 426/285 |
| 5,089,279 A * | 2/1992 | van Rooijen | ............. | A23F 3/32 264/116 |
| 5,538,750 A * | 7/1996 | Yamaguchi | ............... | A23F 3/26 426/594 |
| 2002/0028281 A1* | 3/2002 | Omura | ...................... | A23F 3/14 426/597 |
| 2006/0240167 A1* | 10/2006 | Takahashi | ................. | A23F 3/14 426/597 |
| 2010/0104695 A1* | 4/2010 | Faella | ....................... | A23F 3/32 426/72 |
| 2013/0337116 A1* | 12/2013 | Petralia | ................ | A61K 36/886 426/61 |

FOREIGN PATENT DOCUMENTS

JP           200458479 A   *  2/2004
WO    WO 2006/085710 A1      6/2006

OTHER PUBLICATIONS

Sigma Aldrich, Size conversion chart, 2012, pp. 1-4.*
Sigma Aldrich conversion chart of mesh to mm. Jan. 6, 2010. pp 1-4.*

* cited by examiner

*Primary Examiner* — Hong T Yoo
(74) *Attorney, Agent, or Firm* — Cantor Colburn LLP

(57) ABSTRACT

A tea solid composition comprising a mixture of finely ground tea, a binding agent and water, wherein the mixture forms a tea solid composition in response to heating and subsequent cooling in a mold. The tea solid composition may further include at least one ingredient selected from the group consisting of a sweetener, a ground spice, a flavor extract, a powdered milk product, a color additive and a thickener.

12 Claims, 4 Drawing Sheets

| Mixture | Water | Flavor Extract | Tea Powder | Sweetener | Powdered Milk | Color Additive | Spices | Thickener |
|---|---|---|---|---|---|---|---|---|
| 1.1 | 1% | 0.5% | 2% | 96.5% | | | | |
| 1.2 | 1% | 0.5% | 2% | 96% | | 0.5% | | |
| 1.3 | 1% | 0.5% | 2% | 94.5% | 2% | | | |
| 1.4 | 1% | 0.5% | 2% | 94% | 2% | 0.5% | | |
| 2.1 | 1% | 1% | 2% | 96% | | | | |
| 2.2 | 1% | 1% | 2% | 95.5% | | 0.5% | | |
| 2.3 | 1% | 1% | 2% | 94% | 2% | | | |
| 2.4 | 1% | 1% | 2% | 93.5% | 2% | 0.5% | | |
| 3.1 | 1% | 1% | 3% | 95% | | | | |
| 3.2 | 1% | 1% | 3% | 94.5% | | 0.5% | | |
| 3.3 | 1% | 1% | 3% | 93% | 2% | | | |
| 3.4 | 1% | 1% | 3% | 92.5% | 2% | 0.5% | | |
| 4.1 | 1% | 1% | 4% | 94% | | | | |
| 4.2 | 1% | 1% | 4% | 93.5% | | 0.5% | | |
| 4.3 | 1% | 1% | 4% | 92% | 2% | | | |
| 4.4 | 1% | 1% | 4% | 91.5% | 2% | 0.5% | | |

FIG. 2A

| Mixture | Water | Flavor Extract | Tea Powder | Sweetener | Powdered Milk | Color Additive | Spices | Thickener |
|---|---|---|---|---|---|---|---|---|
| 5.1 | 1.5% | 1% | 4% | 93.5% | | | | |
| 5.2 | 1.5% | 1% | 4% | 93% | | 0.5% | | |
| 5.3 | 1.5% | 1% | 4% | 91.5% | 2% | | | |
| 5.4 | 1.5% | 1% | 4% | 91% | 2% | 0.5% | | |
| 6.1 | 1.5% | 1% | 3% | 94.5% | | | | |
| 6.2 | 1.5% | 1% | 3% | 94% | | 0.5% | | |
| 6.3 | 1.5% | 1% | 3% | 91.5% | 3% | | | |
| 6.4 | 1.5% | 1% | 3% | 91% | 3% | 0.5% | | |
| 6.5 | 5% | 2% | 11% | 80% | | | 2% | |
| 6.6 | 4% | 2% | 74% | | | | 10% | 10% |
| 6.7 | 3% | | 80% | | | | 5% | 12% |
| 6.8 | 6% | | 14% | 80% | | | | |
| 6.9 | 5% | | 68% | | | | 5% | 22% |

FIG. 2B

TEA SOLID COMPOSITION AND PROCESS OF MAKING THE SAME

FIELD OF THE INVENTION

The present invention relates generally to a consumable tea solid composition, and more specifically to a prepared individual serving of a tea composition that is convenient to use.

BACKGROUND OF THE INVENTION

Loose-leaf tea, tea bags and instant tea powders are known in the art. Using loose-leaf tea and tea bags requires the consumer to dispose of the used tea leaves and/or the tea bag after the tea has been brewed. While instant tea powders do not require disposal of the used tea leaves or tea bags, instant tea powders are produced by infusion, extraction and reduction processes, in which a large percentage of the nutrients of the tea, including vitamins, minerals, antioxidants and catechins are lost during the process of making the instant tea powder.

In addition, in the standard process for brewing a cup of tea, the loose-leaf tea and tea bags are separate entities from the sugar and/or milk which are typically added to a tea-based beverage, prior to consumption. Accordingly, a consumer desiring a cup of tea with sugar and milk requires that the user obtain each of these items separately, prior to making the beverage. As such, the standard process for making a cup of tea is time consuming and inconvenient.

According, what is needed in the art is a product that provides a convenient and efficient way of making a cup of tea, while still retaining the desired nutritive value of the resulting brewed tea.

SUMMARY

The present invention provides a product that will aid in the creation of a tea beverage. Specifically, the invention relates to a tea solid composition that can be placed into hot water (above 100° F.), stirred and then immediately consumed. In particular embodiments, the tea solid composition may include a sweetener, dry milk and additional spices and flavorings.

In one embodiment, a method of producing the tea solid composition in accordance with the present invention includes, forming a mixture comprising finely ground tea, a binding agent and water. After the mixture has been formed, the method continues by placing the mixture into a mold, heating the mixture in the mold and allowing the mixture to cool in the mold to form the tea solid composition.

In an additional embodiment, a tea solid composition is provided comprising a mixture of finely ground tea, a binding agent and water, wherein the mixture forms a tea solid composition in response to heating and subsequent cooling in a mold. In a particular embodiment, the mold is dimensioned to provide an individual serving of tea when the tea solid composition is placed into hot or cold water. When placed into hot water, the tea solid composition dissolves and can be immediately consumed. In an alternative embodiment, the tea solid composition can also be placed in cold water (below room temperature) for an extended period of time, such as in a cold brewing process, prior to consumption.

Accordingly, the present invention provides a tea solid composition that provides a convenient and efficient way of making a cup of tea, while still retaining the desired nutritive value of the brewed tea.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

FIG. 2A is a first table illustrating possible embodiments of the tea solid composition of the present invention.

FIG. 2B is a second table illustrating possible embodiments of the tea solid composition of the present invention.

DETAILED DESCRIPTION

The present invention provides a product that will aid in the creation of a tea beverage. Specifically, the invention relates to a tea solid composition that can be placed into hot water (above 100° F.), stirred and then immediately consumed. In particular embodiments, the tea solid composition may include a sweetener, dry milk and additional spices and flavorings.

Figure 1:
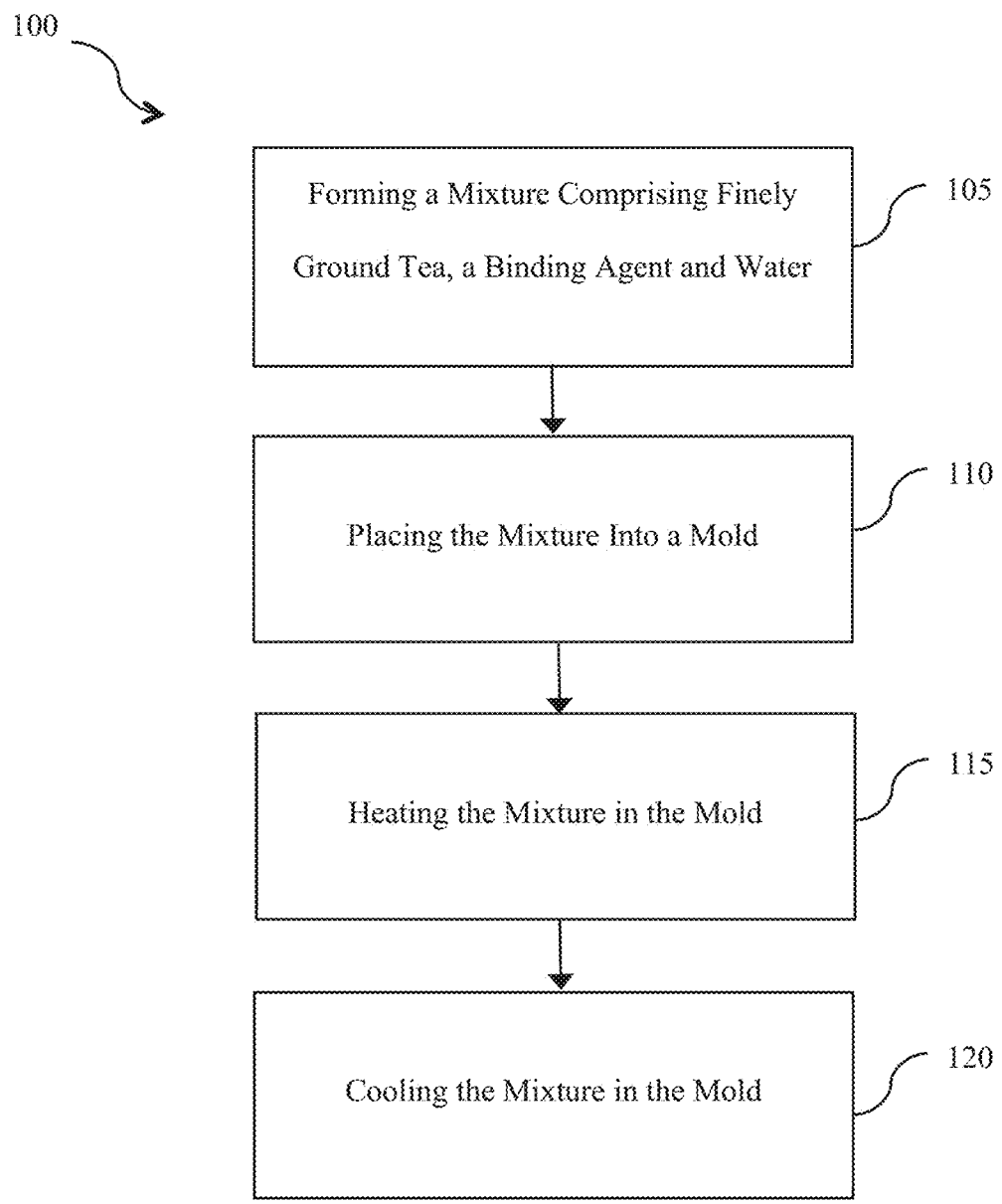
FIG. 1 is a flow diagram illustrating a process for producing the tea solid composition, in accordance with an embodiment of the present invention.

With reference to FIG. 1, in one embodiment a method of manufacturing a tea solid composition 100 in accordance with the present invention includes, forming a mixture comprising finely ground tea, a binding agent and water 105. The method further includes, placing the mixture into a mold 110, heating the mixture in the mold 115 and subsequently cooling the mixture in the mold 120, thereby forming the tea solid composition.

The finely ground tea of the tea solid composition may be prepared by various methods known in the art for grinding tea leaves, such as using a granite stone grinding mill and pressure pulverization. The tea powder of the present invention is not extracted tea, but rather the tea powder is a finely ground tea in which the microscopic particles retain all of the essential characteristics of the original tea leaves. The present invention involves the grinding of tea leaves or components of an herbal tea, using known methods, until a desired particle size has been achieved. In a specific embodiment, the tea is ground using a spice grinder to obtain a tea powder having a particle size between approximately 0.1 mm and 0.2 mm. The particle size of the finely ground tea is such that when the tea solid composition comprising the ground tea powder is placed into a cup of water, the ground tea powder does not completely dissolve and sediment remains from the finely ground tea.

As used herein, the term "tea" relates to any product that may comprise cured leaves of the Cameilla Sinesis plant, despite oxidation levels. The definition of "tea" used herein encompasses all six different types of tea, including white, yellow, green, oolong, black and post-fermented tea. The definition of "tea" also includes the combination of Cameilla Sinesis plus any other additives to the tea including spices, plants, dried fruits, seeds, plant or fruit extracts, whether combined as whole, partial or pulverized. "Tea" also refers to infusion of fruit or herbs made without the tea plant, such as tisane or herbal infusions, but bearing an implied contrast with "tea" as it is construed here. "Tea" may also include herbal or spice varieties, including, but not limited to spearmint, peppermint leaves, ground ginger and ground orange powder. In general, the term "tea" refers to pulverized ingredients (with or without a Camellia Sinesis base), which results in a powder form of tea.

The binding agent that is mixed with the powdered tea is selected such that upon heating and subsequent cooling of the mixture, the powdered tea will be fixed into a solid form. The binding agent may be a solid sweetener, such as sugar, a liquid sweetener, such as honey, or a thickener, such as rice flour.

As used herein, the term "sugar" includes any edible product comprises one or more saccharose groups. As such, the term "sugar" includes all monosaccharide or simple sugars, such as glucose, dextrose, fructose and laevulose, the disaccharides, such as sucrose, also know as table sugar, lactose and maltose and polysaccharides derived from tragacanth. As certain sugars are optically active, such as fructose, the term "sugar" as used herein includes all of the optical isomers and mixtures of such isomers. As user herein, the term "sugar" also includes solid compositions comprising nonnutritive sweeteners, such as those materials having a similar or greater sweetness intensity than table sugar, but with a substantially lower caloric value.

In the present invention, useful sugar based components can take a variety of physical forms, which can be used individually or in any combination as a binding agent for the tea powder mixture. For example, useful sucrose table sugars include granulated table sugar, which has a particle size of from about 0.1 mm to about 1.2 mm and a density of from about 0.8 g/mL to about 0.95 g/mL and fine or powdered sugar, which has a particle size of from about 0.1 mm to about 0.8 mm and an associated lower density than granulated sugar. As long as it is a solid, the sugar can be substantially purse, such as a white table sugar and white powdered sugar, incompletely refined, such that some impurities remain after processing, such as brown table sugar, or raw, such as cane sugar. Other useful forms of sugar include turbinado, pre-flavored or pre-colored sugars, such as are commercially available and other novelty sugars, including rock candy.

The term "sugar" as used herein also encompasses any and all liquid sweeteners. Liquid sweeteners include any solution with a liquid component, at a room temperature setting, that is comprises of monosaccharaides fructose and glucose. This definition includes all forms of honey, a sweet food made by bees using nectar from flowers. It also includes all forms of agave nectar, a sweetener commercially produced from several species of agave. Also included Stevia, coconut sugar and date sugar. This definition also include all forms of syrup, including forms made from xylem sap of sugar maple, red maple or black maple trees. In addition, the term, "liquid sweetener" comprises any parts mixture of sugar and water.

As used herein, the term "thickener" relates to any product that increases the viscosity of a solution or liquid/solid mixture, without substantially modifying its other properties. The definition of "thickener" used herein may include, but is not intended to be limited to, oat fiber, cellulose, rice flour, sugar cane or maltodextrin.

In addition to the powdered tea, binding agent and water, additional ingredients may be added to the mixture prior to placing the mixture into the mold. The additional ingredients may include, at least one sweetener, at least one ground spice, at least one flavor extract, at least one powdered milk product and at least one color additive.

A used herein, the term "powdered milk" or "dried milk" refers to a manufactured dairy product made by evaporating milk to dryness. Because milk powder has a far longer shelf life than liquid milk and does not need to be refrigerated, due to its low moisture content, one purpose of drying milk is to preserve it. Powdered milk and dairy products include dry whole milk, nonfat dry milk, dry buttermilk, dry whey products and dry dairy blends. As used herein, the term "powdered milk product" also encompasses other variations of powdered/dried milk, including coconut milk powder. Additionally, the term used herein also includes lactose-free powdered/dried milk alternatives.

As used herein, the term "color additive" refers to any dye, pigment or substance that imparts color when it is added to food or drink. It can appear in forms consisting of liquids, powders, gels and pastes. Color additives may refer to Certified Colors that are approved by the United States FDA in subpart A of the Code of Federal Regulations—Title 21, Part 73. These certified colors are synthetically produced and are used widely because they impart intense, uniform color, are less expensive and blend more easily to create a variety of hues. There are nine certified color additives approved for use in the United States. Artificial coloring is also included in the term "color additives". In the United States, seven colorings are permitted in food, as of 2007. These artificial colorings include, Blue No. 1, Blue No. 2, Green No. 3, Red No. 40, Red No. 3, Yellow No. 5 and Yellow No. 6. The term "color additive" may also refer to colors that are exempt from certification, including pigments that are derived from natural sources, such as vegetables, minerals or animals. The source of the pigments may include, but is not limited to, caramel coloring (E150), made from caramelized sugar, annatto (E160b), a reddish-orange dye made from the seed of the achiote, chlorophyllin (E140), a green dye made from *Chlorella algae*, cochineal (E120), a red dye derived from the cochineal insect, *Dactylopius coccus*, betanin (E162) extracted from beets, turmeric (curcuminoids, E100), saffron (carotenoids, E160a), paprika (E160c), lycopene (E160d), elderberry juice, pandan (*Pandanus amaryllifolius*), a green food coloring, and butterfly pea (*Clitoria ternatea*), a blue food dye.

As used herein, the term "flavor extract" includes any substance made by extracting a part of a raw material, often by using a solvent, such as ethanol or water. Extracts may be sold as tinctures or in powder form. The aromatic principles of many spices, nuts, herbs, fruits, etc., and some flowers, are marketed as extracts, among the best known of true extracts being almond, cinnamon, cloves, ginger, lemon, nutmeg, orange, peppermint, pistachio, rose, spearmint, vanilla, violet and wintergreen. The definition of "flavor extract" includes the extraction of flavor (natural essences) through any of the methods including, expression, absorption, maceration and distillation. Expression is performed when the oil is very plentiful and easily obtained, as in a lemon peel. Absorption is generally accomplished by steeping in alcohol, as vanilla beans. Maceration is used to create smaller bits of the whole, as in making peppermint extract. Distillation is used along with maceration, but in many cases, distillation requires expert chemical knowledge and the construction of costly stills. Moreover, the definition of "flavor extracts" also includes any substance (essence) chemically created. Concentrated fruit flavors, such as banana, cherry, currant, peach, pineapple, raspberry and strawberry are produced by combinations of various esters together with special oils. The desired colors are generally obtained by the use of dyes. Among the esters most generally employed are ethyl acetate and ethyl butyrate.

As shown with reference to FIG. 2A and FIG. 2B, various powdered tea mixtures are considered within the scope of the present invention. The tables shown in FIG. 2A and FIG. 2B illustrate various tea solid compositions in accordance with the present invention may include various percentages of powdered tea, water and a binding agent, in the form of a sweetener or a thickener, in addition to flavor extracts, powdered milk spices and color additives. For example, as shown in the top row of the table in FIG. 2A, the mixture forming the tea solid composition of the present invention may include 1% water, 0.5% flavor extract, 2% tea powder and 96.5% sugar. In an additional embodiment, as shown in the bottom row of the table in FIG. 2B, the mixture forming the tea solid composition of the present invention may include 5% water, 68% tea powder, 5% spices and 22% thickener.

After the mixture comprising the finely ground tea, the binding agent and the water has been prepared, the method of the present invention continues by placing the mixture into a desired mold 110. The shape of the mold determines the size and shape of the tea solid composition. The mold may be shaped in various three-dimensional geometric configurations, including, but not limited to, heart, sphere, cube, animal shape, star, diamond, triangular. The mold may also be provided in various dimensions to provide different sizes of the tea solid composition. In general, the shape and weight of the tea solid composition is approximately between 6 grams and 6 grams, making the tea solid composition very portable. In one embodiment the mold is sized to provide an individual serving of tea when the tea solid composition is place into hot or cold water.

After the mixture has been placed in the desired mold 110, the method continues by heating the mixture in the mold further comprises heating the mixture in the mold 115. In one embodiment, the mixture and the mold are heated in an oven at a temperature of between about 150° F. and 180° F. for a duration of approximately 1 hr. to 1.5 hrs. In a specific embodiment, the mixture and the mold are heated in an oven at a temperature of 175° F. for a duration of 1 hr. to 1.5 hrs. During the heating process, the water and the any additional liquid from other ingredients in the tea powder mixture substantially evaporate from the mixture.

Following the heating of the mixture within the mold 115, the mold is removed from the oven and allowed to cool at approximately ambient temperature for a duration of about 1 hr. to 2 hrs. As the heated tea powder mixture cools, the binding agent solidifies and binds the powdered tea into the desired shape defined by the mold, forming the tea solid composition of the present invention.

Figure 3A:
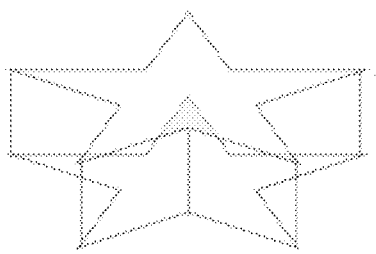
FIG. 3A is a diagrammatic view of a tea solid composition in the form of a three-dimension star, in accordance with an embodiment of the present invention.
Figure 3B:
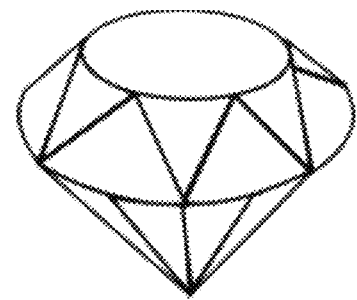
FIG. 3B is a diagrammatic view of a tea solid composition in the form of a three-dimensional diamond, in accordance with an embodiment of the present invention.
Figure 3C:
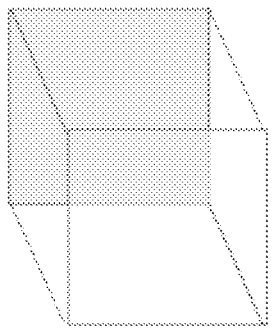
FIG. 3C is a diagrammatic view of a tea solid composition in the form of a cube, in accordance with an embodiment of the present invention.
Figure 3D:
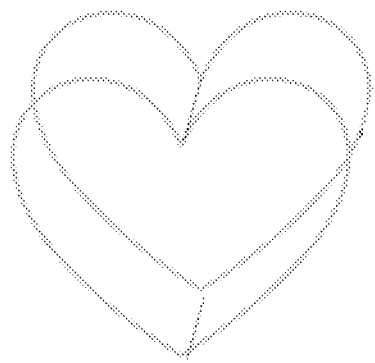
FIG. 3D is a diagrammatic view of a tea solid composition in the form of a three-dimensional heart, in accordance with an embodiment of the present invention.
Figure 3E:
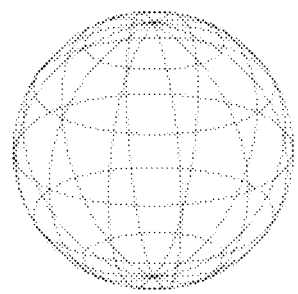
FIG. 3E is a diagrammatic view of a tea solid composition in the form of a sphere, in accordance with an embodiment of the present invention.

After the powdered tea mixture has cooled in the molds, the resulting tea solid composition can be easily handled while retaining its desired shape. As shown with reference to FIG. 3A-FIG. 3E, the tea solid composition of the present invention may take on various solid shapes. FIG. 3A is a diagrammatic view of a tea solid composition in the form of a three-dimension star, in accordance with an embodiment of the present invention. FIG. 3B is a diagrammatic view of a tea solid composition in the form of a three-dimensional diamond, in accordance with an embodiment of the present invention. FIG. 3C is a diagrammatic view of a tea solid composition in the form of a cube, in accordance with an embodiment of the present invention. FIG. 3D is a diagrammatic view of a tea solid composition in the form of a three-dimensional heart, in accordance with an embodiment of the present invention. FIG. 3E is a diagrammatic view of a tea solid composition in the form of a sphere, in accordance with an embodiment of the present invention. As illustrated, in some embodiments, one dimension of the tea solid composition may be between 0.5 inch and 2 inches.

The tea solid composition of the present invention includes a mixture of finely ground tea, a binding agent and water, wherein the mixture forms a tea solid composition in response to heating and subsequent cooling in a mold. The tea solid composition may further include at least one ingredient selected from the group consisting of a sweetener, a ground spice, a flavor extract, a powdered milk product, a color additive and a thickener.

The present invention provides a product that will aid in the creation of a tea beverage. Specifically, the invention relates to a tea solid composition that can be placed into hot water (above 100° F.), stirred and then immediately consumed. In particular embodiments, the tea solid composition may include a sweetener, dry milk and additional spices and flavorings.

As such, the present invention provides a tea solid composition that greatly reduces the time and equipment involved in preparing a tea-based beverage. By combining the tea, a sweetener and milk into one solid compound, the time necessary to prepare a tea-based beverage is minimized and the convenience associated with enjoying a cup of tea in increased.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A method of manufacturing a tea solid composition, the method comprising:
   grinding dried tea leaves into a finely ground tea powder;
   forming a mixture comprising the tea powder, a binding agent, and water;
   placing the mixture into a mold;
   heating the mixture in the mold at a temperature of between about 150° F. and 180° F. for a duration of approximately 1 hr to 1.5 hr, evaporating water from the mixture during the heating; and
   cooling the mixture in the mold to form the tea solid composition; wherein the tea powder in the tea solid composition does not dissolve when the tea solid composition is placed in a cup of water.

2. The method of claim 1, wherein the tea powder is not from extracted tea.

3. The method of claim 1, further comprising grinding the tea leaves until the tea powder has a particle size of between approximately 0.1 mm and 0.2 mm.

4. The method of claim 1, further comprising selecting the tea powder from the group consisting of white, yellow, green, oolong, black, post-fermented, tisane and herbal tea powder.

5. The method of claim 1, further comprising selecting the binding agent from the group consisting of a solid sweetener, a liquid sweetener and a thickener.

6. The method of claim 1, further comprising adding a sweetener to the mixture prior to placing the mixture in the mold.

7. The method of claim 1, further comprising adding a ground spice to the mixture.

8. The method of claim 1, further comprising adding a flavor extract to the mixture.

9. The method of claim 1, further comprising adding a powdered milk product to the mixture.

10. The method of claim 1, further comprising adding a color additive to the mixture.

11. The method of claim 1, wherein the mixture is cooled in the mold for a duration of about 1 hr to 2 hr.

12. The method of claim 1, where one dimension of the tea solid composition is 0.5 inch to 2 inches.

\* \* \* \* \*